INVENTOR
Roy Hurshel Tyler

BY Cecil L. Wood

ATTORNEY

Jan. 20, 1970    R. H. TYLER    3,491,201
OSCILLATORY SCANNING CAMERA

Filed June 13, 1966    3 Sheets-Sheet 2

INVENTOR
Roy Hurshel Tyler

BY

ATTORNEY

Jan. 20, 1970 R. H. TYLER 3,491,201
OSCILLATORY SCANNING CAMERA
Filed June 13, 1966 3 Sheets-Sheet 3

INVENTOR
Roy Hurshel Tyler

BY Cecil L. Wood

ATTORNEY

United States Patent Office 3,491,201
Patented Jan. 20, 1970

3,491,201
OSCILLATORY SCANNING CAMERA
Roy Hurshel Tyler, Dallas, Tex., assignor to
J. R. Tozer, Jr., Dallas, Tex.
Filed June 13, 1966, Ser. No. 557,000
Int. Cl. H01j 29/02, 29/86
U.S. Cl. 178—7.81          1 Claim

ABSTRACT OF THE DISCLOSURE

An oscillatory scanning camera for automatically, intermittently and successively focusing on a circular array of a series of dials or gauges, such as intruments for indicating temperatures, barometric pressures, wind velocity, and the like, whereby the readings can be televised and transmitted to remote receivers.

---

This invention relates to a remote visual information monitoring system, and more particularly it relates to a system for televising or photographically recording the activity in a prescribed area.

The invention is related to those shown and described in my Patent No. 3,226,476, dated Dec. 28, 1965, and in my copending application, Ser. No. 557,001, filed June 13, 1966.

My invention has important applications in many fields, but in particular it solves the problem of providing a visual reproduction of an array of constantly varying instrumentation, dials, or gauges supplying related portions of information to a large number of observers at remote viewing stations.

A long felt need for my invention arose in connection with the problem of supplying weather data and other information simultaneously to a number of residents of hotels, motels, apartment complexes, and the like by means of regular or closed circuit television channels, and by a system that would require a minimum of personnel. The device may also be employed in broadcasting weather data, or other similar information, to residences of relatively large areas.

To solve this problem I devised a system wherein the vital weather data is measured and displayed on a series of dials capable of indicating current temperature, atmospheric pressure, wind velocity, and other variable factors. The problem then arose of providing a means whereby these dials could be automatically scanned at intervals by a television transmitter so that they can be viewed and visually monitored on a larger number of remote receivers.

In summarzing the foregoing, it is therefore a general object of my invention to provide a system for visually monitoring a prescribed area such as one occupied by an array of instruments with either photographic or television camera equipment so that the instruments or the subject matter recorded can be easily viewed at remote stations.

A particular problem in visually monitoring a large number of dials or gauges was that of reproducing a picture wherein each dial appears large enough on the viewing screen and is clear and distinct. Assembling a plurality of dials together and including them within a single picture by means of a wide angle lens is unsatisfactory because each individual dial becomes too small and is thus difficult to read on the television screen.

My invention solves this problem by providing an apparatus wherein the dials or gauges are mounted in fixed spaced apart relationship, in a circular pattern, on an upright panel which is connected to and positioned relative to a turret type camera support including a movable platform having a camera thereon, and having means for oscillating it about vertical and horizontal axes simultaneously, within predetermined limits and at a controllable rate, to produce a circular motion of the camera lens in a path coinciding with the circular pattern.

An important feature of the invention is that the oscillating movement of the platform about the vertical and horizontal axes is intermittent, by stages, whereby the camera lens is caused to be focused on the dials or gauges successively, in rotation, for predetermined time intervals.

Another object of my invention is to provide a scanning device, as described, that can be automatically or manually controlled at a position located remotely from the apparatus and which can be operated either continuously or intermittently.

Another object of the invention is to provide a visual monitoring device for scanning a prescribed area that is low in maintenance and operating cost as well as being unusually well adapted for ease and economy of production.

Yet another object of my invention is to provide an automatic self operating information transmission apparatus that is particularly compact and which can accommodate a number of information dials on an upright panel as described located at a proper viewing distance from the camera.

While the foregoing objects are paramount, other and lesser objects will become apparent as the description proceeds, when considered in connection with the appended drawings wherein.

Figure 1:
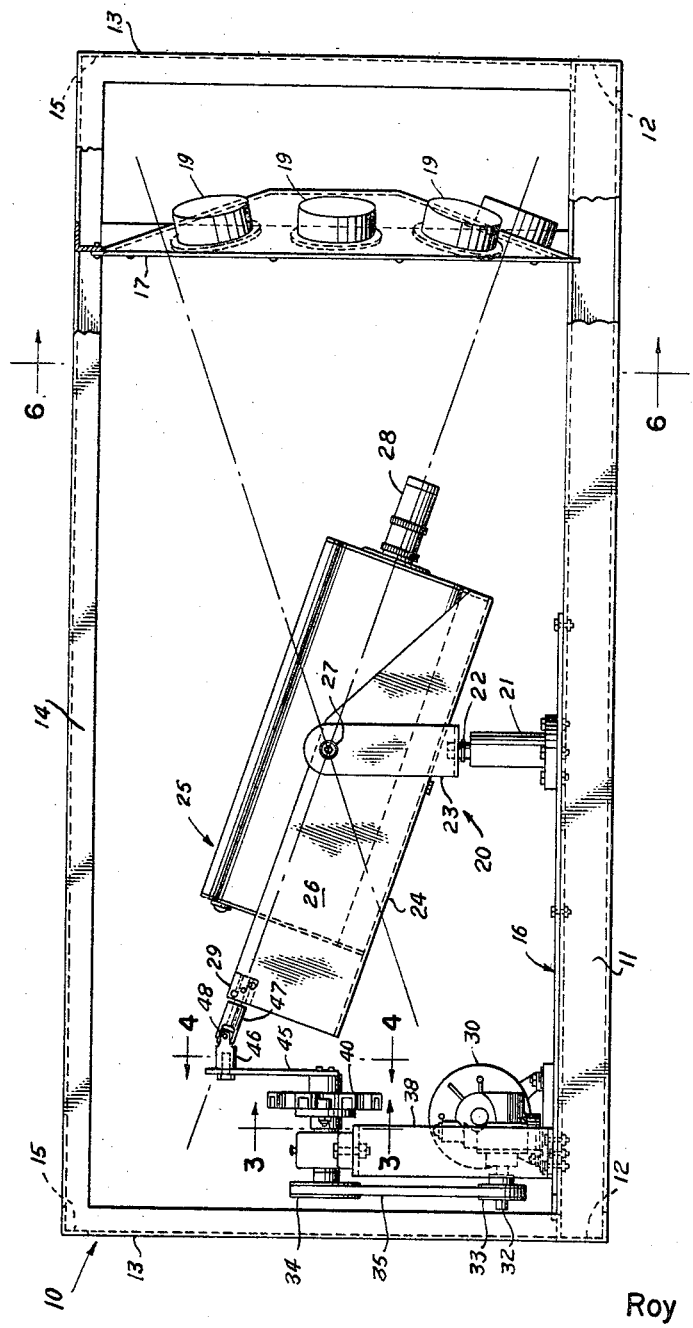
FIGURE 1 is a side elevational view of a television scanning device embodying the invention.
Figure 2:
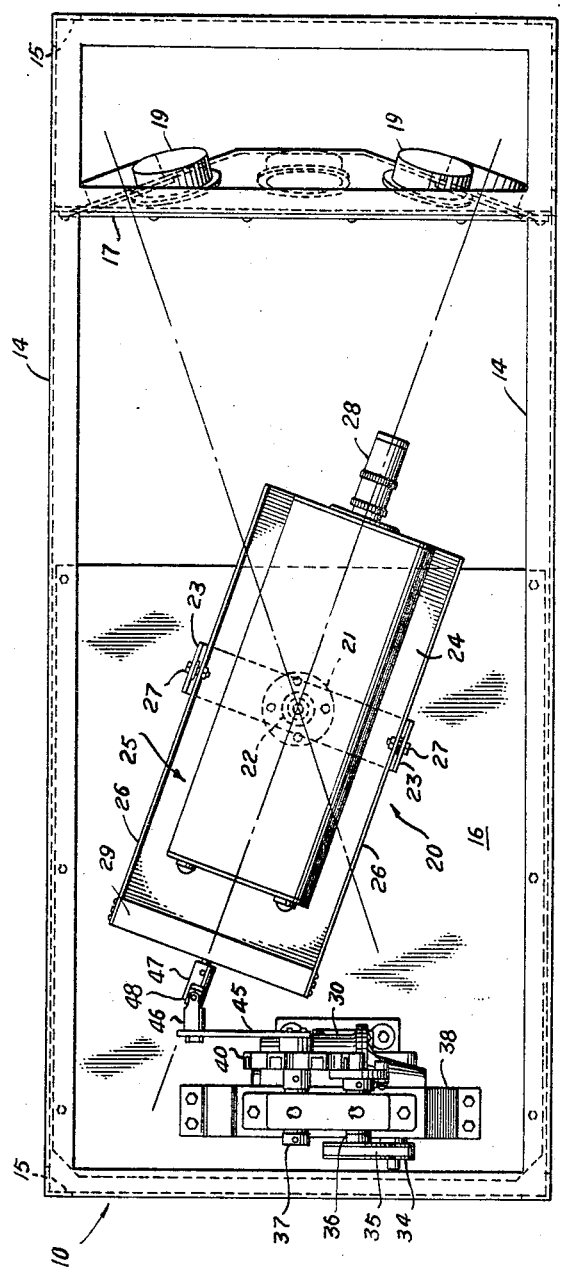
FIGURE 2 is a top plan view thereof.
Figure 4:
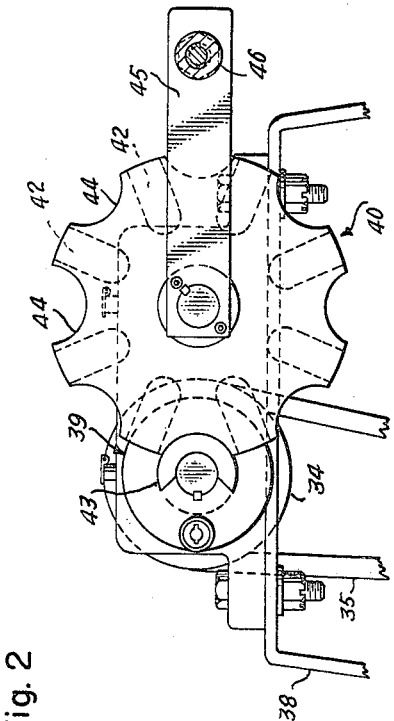
FIGURE 4 is a fragmentary sectional elevational view on an enlarged scale taken on the line 4—4 of FIGURE 1.
Figure 3:
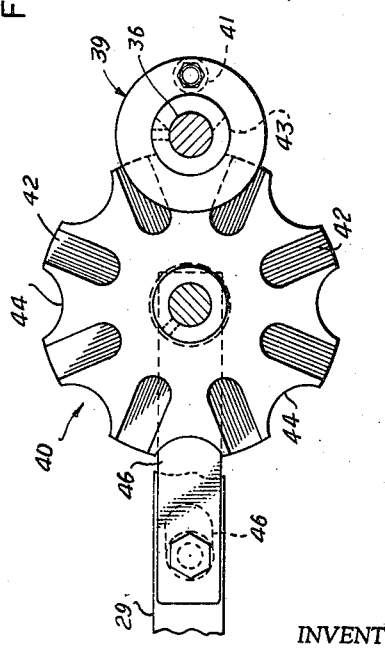
FIGURE 3 is a fragmentary sectional elevational view on an enlarged scale taken on the line 3—3 of FIGURE 1.
Figure 5:
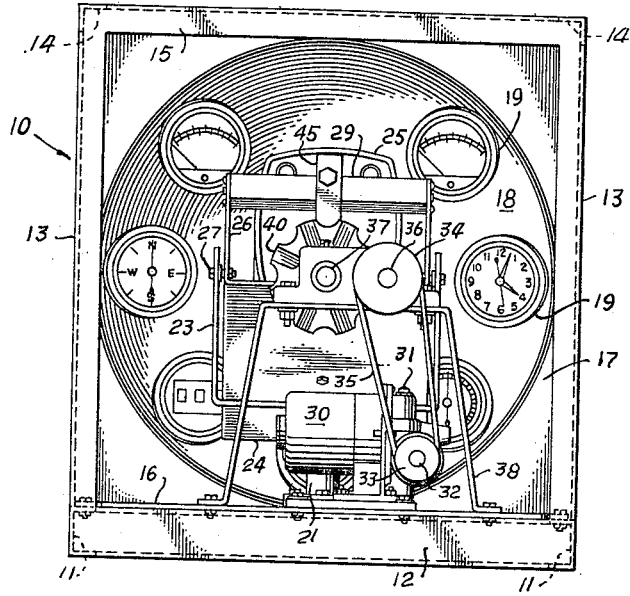
FIGURE 5 is an end elevational view.
Figure 6:
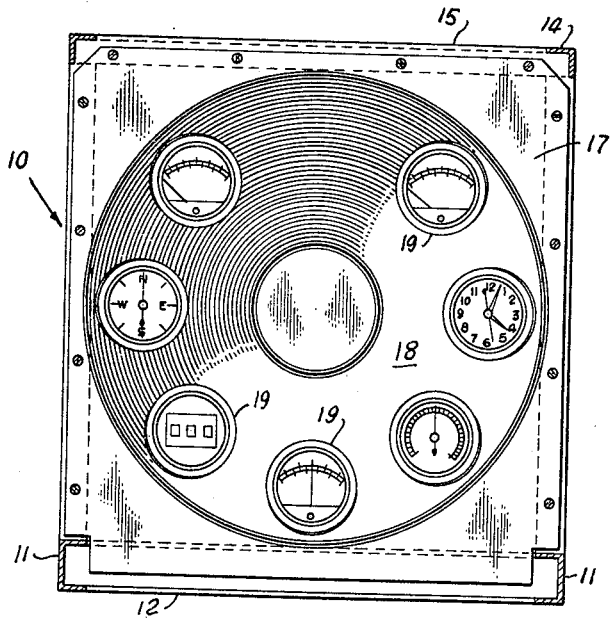
FIGURE 6 is a sectional elevational view taken on the line 6—6 of FIGURE 1.

Referring to the drawing, the television scanning device embodying the invention includes a box shaped, generally rectangular open frame, designated generally by the numeral 10, having a base formed by a pair of side rails 11 and a pair of end members 12, two pairs of corner posts 13, and a top formed by a pair of side rails 14 and a pair of end members 15.

The first mentioned side rails 11 and end members 12, which form the base of the frame 10, are channel shaped in transverse section, while the corner posts 13, and the last mentioned side rails 14 and end members 15, which form the top of the frame 10, are right angular in transverse section.

A deck plate 16 extends across the top sides of the first mentioned side rails 11, which with the end members 12 form the base of the frame 10, beginning at one end thereof, and a bulkhead 17, which has an upstanding instrument panel 18 thereon, is arranged transversely of the frame 10, in spaced apart relation to the end thereof opposite said one of its ends.

The vertical instrument panel 18 has a plurality of dials or gauges, indicated generally by the numerals 19, arranged in a circular pattern thereon, facing the opposite end of the frame 10, in predetermined spaced apart relation to each other.

The invention also includes a turret type camera support as hereinafter described, indicated generally by the numeral 20, which has an upstanding, generally cylindrical pedestal 21 whereby it is supported on the deck plate 16, in spaced apart relation to the instrument panel 18.

A vertically extending shaft 22, which is arranged concentrically and coaxially relative to the pedestal 21 and extends a short distance above it, and is rotatable axially relative thereto, has an upstanding bifurcated member 23 on its upper end, rotatable therewith.

A movable platform 24, which has a camera 25 thereon, and has upstanding sides 26 which embrace the camera 25, is itself embraced by said upstanding bifurcated member 23 and has its opposite sides 26 pivotally connected thereto, as at 27, intermediate the ends of the platform 24 and adjacent the upper edges of the sides 26, for rotative adjustment about a horizontal axis.

The upstanding sides 26 of the platform 24 are connected at the top, adjacent the end thereof opposite the lens of the camera 25, indicated by the numeral 28, by a cross brace 29, which is right angular in transverse section.

The axis of the lens 28 of the camera 25 coincides with an imaginary line extending longitudinally of the platform 24 and intersecting a vertically extending line coinciding with the axis of the vertically extending shaft 22 and a horizontally extending line drawn between the connections 27 whereby the platform 24 is pivotally connected to the bifurcated member 23.

The invention further includes drive means as hereinafter described acting on the cross brace 29 to oscillate the platform 24 about a vertical axis corresponding to the axis of the shaft 22, and at the same time about a horizontal axis corresponding to a line drawn between the connections 27 whereby the platform 24 is pivotally connected to the bifurcated member 23, to thereby produce a circular motion of the lens 28 of the camera 25, which faces the instrument panel 18, and the lens 28 is caused to move in a circular path corresponding to the circular pattern of the dials or gauges 19.

The oscillating movement of the platform 24 about said vertical and horizontal axes simultaneously is intermittent, by stages, whereby the lens 28 is caused to be focused on the dials or gauges 19 successively, in rotation, for predetermined time intervals.

An electric motor 30, which is mounted on the deck plate 16 near the end of the frame 10 opposite the instrument panel 18, is operatively connected, through speed reducing gears 31, to a first drive shaft 32 which in turn is connected, by a pair of pulleys 33, 34 and a connecting belt 35, to a second drive shaft 36 which, with a third drive shaft 37, is rotatably supported on an upstanding bracket 38, above the deck plate 16, and extends horizontally, longitudinally of the frame 10, in spaced apart relation to the adjacent end of the platform 24.

The second drive shaft 36 is drivingly connected to the third drive shaft 37 by a drive wheel 39 on the second drive shaft 36 and a comparatively larger drive wheel 40 on the third drive shaft 37 which have mutually engaging means thereon as hereinafter described whereby the drive wheels 39 and 40 together are operable as a Geneva movement and said last mentioned drive wheel 40 is adapted to be rotated intermittently, by stages, a predetermined fraction of a revolution for each complete revolution of said first mentioned drive wheel 39, in response to rotation of said first mentioned drive wheel 39.

The mutually engaging means above mentioned comprises an eccentric roller 41 on the drive wheel 39 for selective engagement with a plurality of circumferentially spaced radially extending grooves 42 in the drive wheel 40, and an arcuate boss 43 on the drive wheel 39, on the side thereof opposite the eccentric roller 41 and spaced radially inwardly relative thereto, for selective engagement with arcuate depressions 44 in the peripheral surface of the drive wheel 40, between the grooves 42.

The third drive shaft 37 is arranged in parallel, laterally spaced relation to the second drive shaft 36, and the axis of the third drive shaft 37 coincides with an imaginary line extending longitudinally of the frame 10 and intersecting a vertically extending line coinciding with the axis of the vertically extending shaft 22 and a horizontally extending line drawn between the connections 27 whereby the platform 24 is pivotally connected to the bifurcated member 23.

An arm 45, which is connected to the third drive shaft 37 and extends radially outwardly beyond the last mentioned drive wheel 40, and turns with it, is connected by a pair of links 46 and 47, which are connected to each other by a universal joint, as at 48, to the cross brace 29 intermediate its ends.

In operation, an intermittent rotary movement is imparted to the end of the platform 24 opposite the camera lens 28, to thereby oscillate the platform 24 about vertical and horizontal axes simultaneously and to produce a corresponding intermittent, rotary motion to the lens 28 of the camera 25, as above described, in response to rotation of the last mentioned drive wheel 40.

The invention may be modified within certain limitations by persons skilled in the art without departing from the spirit and intent thereof or the scope of the appended claim.

What is claimed is:

1. In a television scanning device having an elongated frame, an instrument panel arranged vertically and transversely of the frame near one of its ends and having a circular arrangement of uniformly spaced dials or gauges thereon, a turret type camera support mounted on the frame intermediate its ends and spaced from said instrument panel, a movable platform on said support having means for rotative adjustment thereof about vertical and horizontal axes simultaneously, a camera operatively positioned on said platform with its lens facing said instrument panel, and drive means on said frame comprising a motor and a shaft having a driving connection with said motor, a crank arm on said shaft and a universal joint connecting said crank arm to said platform, the said drive means acting on said platform to oscillate it about said vertical and horizontal axes simultaneously, and to move said lens in a circular path corresponding to the circular pattern of said dials or gauges and to successively focus them thereon at predetermined time intervals, said drive means having a timing mechanism operatively connected therein to oscillate said platform about said vertical and horizontal axes intermittently and advance said lens along said circular path by stages and cause it to be focused on said dials or gauges successively for said predetermined time intervals.

References Cited

UNITED STATES PATENTS

| | | | |
|---|---|---|---|
| 3,226,476 | 12/1965 | Tyler | 178—6 |
| 3,239,601 | 3/1966 | Keys | 178—6 |
| 3,363,103 | 1/1968 | Fowler et al. | 178—6.8 X |
| 3,236,116 | 2/1966 | Hafferkamp et al. | 74—436 |

OTHER REFERENCES

Pamphlet by Telemation, Inc. Titled "Weather Channel" (4 pages), received in the patent office Apr. 9, 1965.

RICHARD MURRAY, Primary Examiner

R. K. ECKERT, JR., Assistant Examiner

U.S. Cl. X.R.

178—7.8